United States Patent
Vakhrushin et al.

(10) Patent No.: US 10,204,711 B2
(45) Date of Patent: Feb. 12, 2019

(54) CONTROL ROD DRIVE INCLUDES AN ELECTRIC DRIVE AND A TOOTHED RACK

(71) Applicant: Joint Stock Company "AKME-Engineering", Moscow (RU)

(72) Inventors: Mikhail Petrovich Vakhrushin, Moscow (RU); Ivan Aleksandrovich Golovin, Podolsk (RU); Aleksey Ivanovich Podin, Podolsk (RU); Anton Erikovich Usmanov, Podolsk (RU)

(73) Assignee: Joint Stock Company "AKME-Engineering", Moscow (RU)

( * ) Notice: Subject to any disclaimer, the term of this patent is extended or adjusted under 35 U.S.C. 154(b) by 360 days.

(21) Appl. No.: 15/021,694

(22) PCT Filed: Apr. 18, 2014

(86) PCT No.: PCT/RU2014/000283
§ 371 (c)(1),
(2) Date: Mar. 12, 2016

(87) PCT Pub. No.: WO2015/065234
PCT Pub. Date: May 7, 2015

(65) Prior Publication Data
US 2017/0148532 A1     May 25, 2017

(30) Foreign Application Priority Data
Oct. 31, 2013 (RU) .............................. 2013148440

(51) Int. Cl.
*G21C 7/14* (2006.01)
*H02K 11/21* (2016.01)
(Continued)

(52) U.S. Cl.
CPC ............... *G21C 7/14* (2013.01); *H02K 7/106* (2013.01); *H02K 7/11* (2013.01); *H02K 7/116* (2013.01);
(Continued)

(58) Field of Classification Search
CPC .......... G21C 7/14; H02K 11/21; H02K 7/106; H02K 7/11; H02K 7/116
(Continued)

(56) References Cited

U.S. PATENT DOCUMENTS

| 3,494,827 A | | 2/1970 | Zinn | |
| 4,124,442 A | * | 11/1978 | Zhuchkov | G21C 7/12 376/233 |
| 2011/0222640 A1 | * | 9/2011 | DeSantis | G21C 7/14 376/229 |

FOREIGN PATENT DOCUMENTS

| GB | 1165137 | * | 9/1969 |
| JP | 2000-258577 | * | 9/2000 |

(Continued)

OTHER PUBLICATIONS

English Abstract of SU 757020.
(Continued)

*Primary Examiner* — Jack W Keith
*Assistant Examiner* — Daniel Wasil
(74) *Attorney, Agent, or Firm* — Preston Smirman; Smirman IP Law, PLLC

(57) ABSTRACT

Systems for controlling and protesting nuclear reactors. A drive of an emergency safety rod of a nuclear reactor includes an electric drive, a reduction gear, and a rack-and-pinion gear. The electric drive contains a contactless electric motor based on permanent magnets, which is installed in the housing of the electric drive with a motor rotor position sensor, and a reduction gear for changing the rate of rotation
(Continued)

of the electric drive. A toothed rack is installed along the axis of the rack-and-pinion gear in order to provide for the reciprocating motion of a system absorber rod connected thereto. A toothed electromagnetic clutch having a contactless current supply is installed on an inner shaft of the rack-and-pinion gear, enabling the rigid and simultaneous mechanical coupling of half-couplings, and the drive contains a reverse-motion coupling, a rack-separation spring and toothed rack position sensors.

11 Claims, 4 Drawing Sheets

(51) Int. Cl.
  *H02K 7/106* (2006.01)
  *H02K 7/11* (2006.01)
  *H02K 7/116* (2006.01)
(52) U.S. Cl.
  CPC .......... *H02K 11/21* (2016.01); *G21Y 2004/30* (2013.01); *Y02E 30/34* (2013.01); *Y02E 30/39* (2013.01)
(58) Field of Classification Search
  USPC .................................................. 376/228, 232
  See application file for complete search history.

(56) References Cited

FOREIGN PATENT DOCUMENTS

| | | |
|---|---|---|
| RU | 2107341 | 3/1998 |
| RU | 52243 | 3/2006 |
| SU | 1364099 | 6/1993 |
| SU | 1748544 | 2/1994 |
| SU | 757020 | 1/1996 |

OTHER PUBLICATIONS

English Abstract of SU 1748544.
English Abstract of RU 52243.
English Abstract of SU 1364099.
Mitenkov, F. M. et al., "The Actuators of Control and Protection Rods for Sodium-Cooled Fast Reactors," Atomizdat, 1980, p. 51-58.
International Search Report dated Aug. 21, 2014.
Translation of International Search Report dated Aug. 21, 2014.
Written Opinion of the International Searching Authority dated Aug. 8, 2014.
Translation of Written Opinion of the International Searching Authority dated Aug. 8, 2014.
International Preliminary Report on Patentability dated May 3, 2016.

\* cited by examiner

CONTROL ROD DRIVE INCLUDES AN ELECTRIC DRIVE AND A TOOTHED RACK

CROSS-REFERENCE TO RELATED APPLICATION

The instant application is a national phase of PCT International Application No. PCT/RU2014/000283 filed Apr. 18, 2014, and claims priority to Russian Patent Application Serial No. 2013148440, filed Oct. 31, 2013, the entire specifications of both of which are expressly incorporated herein by reference.

FIELD OF THE INVENTION

The invention relates to nuclear technology, and specifically to systems for operation of fast-neutron nuclear reactors under emergency negative reactivity insertion conditions and to control and protection systems (CPS) of nuclear reactors.

PRIOR ART

A double-circuit reactor plant with a heavy liquid metal coolant (eutectic lead-bismuth alloy) in the primary circuit and an operating medium (water-steam) in the secondary circuit is designed to convert nuclear energy into thermal energy of saturated steam.

Emergency protection drive is a CPS device designed to perform safety functions of fast, automatic and remote manual termination of a nuclear fission chain reaction in the reactor plant (RP) core by means of rapid insertion of an emergency safety control rod into the reactor plant core.

In modern reactor control and protection systems high requirements are imposed on actuators specifications, such as the rate of control rod insertion into a core and reliability of the emergency protection function, i.e. fail-safe control rod insertion into a core.

An actuator of BN-350 reactor emergency safety members (Mitenkov F. M. et al. The Actuators of Control and Protection Rods for Sodium-Cooled Fast Reactors, Atomizdat, 1980, pp. 51-58) is known. The actuator consists of two separate assemblies: a servo and a sealed rack with a rod and rack-and-pinion gear. The rack with a rod is mounted on the flange of the structure pipe of the central reactor column. The rack consists of a rack itself, a tipped rod and grips. There are guide rods at the bottom of the rack, and a damping spring at the top. A guide bar and lower pipe connected to the drive cam splines controlling the grips pass through the rod.

The rack-and-pinion gear includes a pair of gears, guide rollers, an accelerating spring, and a case with inductive end switches.

The servo is a separate assembly to be installed on the base plate support. The output shaft of the servo reduction gear is connected to the input shaft of the rack-and-pinion gear using a toothed clutch. The servo consists of a DC electric motor, two-stage worm-type reduction gear, electric magnet, position sensor, cone friction clutch with control levers, and a spindle nut. The electric motor shaft is connected to the reduction gear input shaft through a cross-link clutch.

Rotation is transmitted from the electric motor by means of the cross-type clutch, a pair of cylinder and worm gears to the drive friction half-coupling through ball-type connectors. When the electric magnet is switched on, the latter transmits motion to the driven half-coupling and through two pairs of cylinder gears to the output shaft. The required clutch torque on the friction clutch is provided through the electric magnet through a yoke, lever and cross members with springs and through thrust bearings installed therein. Motion is transmitted from the servo through the toothed clutch to the seal assembly shaft, and then to the pair of gears converting the rotational motion into the reciprocating motion of the rod with grips and reactor emergency safety member.

However, the design of the actuator has a number of disadvantages. The mechanism includes two assemblies, has complicated gearing, as the motor is asynchronous and non-adjustable. Coupling is provided via the friction clutch with a separate electric magnet. Reliability of the friction clutch coupling may be reduced due to ingress of a lubricant, foreign objects, for example, in the process due to the wearing of friction surfaces. The mechanism is difficult-to-make and has large dimensions.

An actuator of BN-600 reactor emergency safety members (Mitenkov F. M. et al. The Actuators of Control and Protection Rods for Sodium-Cooled Fast Reactors, Atomizdat, 1980, pp. 62-71) is also known. The gearing diagram, as well as the control rod actuator diagram, consists of two drive trains: a rod servo and grip servo. The former consists of an electric drive, upper, intermediate and lower reduction gears, torsion shaft, electromagnetic clutch, overrun clutch, a pair of gears, rod with grips, position sensor, accelerating and damping springs.

The grip servo gearing diagram includes an electric motor, two-stage worm-type reduction gear, rotary tube, pulse sensor, hollow shaft with a cam, and a guide bar.

The functional actuator of BN-600 reactor emergency safety members is close to the actuator of BN-350 reactor emergency safety members. The dimensions have been reduced. However, its gearing have become more complicated. Complication of gearing leads to a reliability degradation of the actuator.

Moreover, use of a magnetic friction clutch instead of the contactless electromagnetic one creates an electromagnetic field. Provided that, when the driven rotor resistance moment is increased, teeth of the driven rotor are shifted relative to the drive rotor teeth by a certain angle. If a load is imposed on the driven rotor shaft, such that the shifting angle between the rotor teeth exceeds the limit, slippage, i.e. breakdown, will occur. The rotors fall out of synchronism and the torque is no longer transmitted.

In addition, the inertia moment of rotating parts transmitted to the rack pinion increases the rod drop time. One of the disadvantages of the clutch is its high energy consumption.

INVENTION DISCLOSURE

The invention solves the problem of reducing the time of negative reactivity insertion into a nuclear reactor core in case of an emergency, improving reliability of the emergency safety rod drive design, and consequently, improving safety and reliability of the reactor plant as a whole.

The technical result of the claimed nuclear reactor emergency safety rod drive design is as follows:
  reliable drive gearing operation;
  reduction of the drive train opening time, and, consequently, reduction of the emergency safety absorber rod insertion time in case of an emergency or blackout;
  reliable interlocking of the reverse motion of the rack with a CPS absorber rod (jumping) when the absorber rod is dropped, excluding rotation of the rack pinion for lifting operation through the overrun clutch;

elimination of complex adjustment and combined setting of the electric magnet and toothed clutch system; miniaturization of the drive.

To solve this problem, design of a nuclear reactor emergency safety absorber rod drive comprising an electric drive, a reduction gear and a rack-and-pinion gear has been suggested. The electric drive comprises a brushless electric motor, a motor stator installed in the electric drive housing, and a rotor rigidly connected to the drive shaft. The contactless electric motor based on permanent magnets is used as a brushless electric motor. The drive shaft is mounted on rotating bearings.

A contactless synchro resolver is mounted on the electric drive shaft. A normally closed electromagnetic brake is also mounted on this shaft.

A toothed rack is installed along the axis of the rack-and-pinion gear in order to provide for the reciprocating motion of a CPS absorber rod connected thereto by means of the rack pinion converting the rotating motion into linear.

The toothed rack of the rack-and-pinion gear is installed in the guides inside the rack-and-pinion gear housing. A high-coercivity magnet is installed in the upper part of the toothed rack. Its protective sleeve serves as a guide. The magnet is set to send a signal to the inductive limit switches controlling the end positions of the toothed rack with CPS absorber rods. Inductive limit switches are installed outside the housing of the rack-and-pinion gear.

The upper end of the rack-separation spring rests against the rack-and-pinion gear housing case cover, while its lower end rests on the magnet sleeve.

The electromagnetic clutch is installed on the inner shaft of the rack-and-pinion gear with its housing fixed in the rack-and-pinion gear inner cavity. The gear half-coupling is mounted on the input element of the electromagnetic clutch and rigidly connected to the overrun clutch sleeve, and the overrun clutch hub is mounted on the shaft.

The electric drive axis is parallel to the axis of the toothed rack.

The CPS absorber rod is dropped when the drive train is opened.

The toothed rack-separation spring may be composite and consist of several parts interconnected by special bushings. This will allow to control the performance of the drive and to reduce the cost of production.

The inner cavity of the emergency safety absorber rod drive is leak-tight. Connections of the main drive assemblies have seals of a radiation-resistant material.

The motor stator mounted in the electric drive housing is secured against rotation and axial displacement.

The contactless torque motor endures a torque on the shaft with the required speed and torque values.

The contactless synchro resolver serves as a contactless position sensor of the electric motor rotor.

If the motor is deenergized, the electromagnet brake prevents the shaft from rotating, thus avoiding motion of the toothed rack with a CPS absorber rod.

The toothed half-coupling is designed to transmit torque from the electric drive to the rack-and-pinion gear. The half-coupling is mounted on the input member of the electromagnetic clutch and represents an overrun clutch sleeve.

The overrun clutch prevents the CPS absorber rod from jumping when it is dropped in the core and eliminates its lifting operation due to external dynamic loads when the electromagnetic clutch is deenergized.

Structurally, the claimed drive of an emergency safety absorber rod, including an electric drive, a reduction gear and a rack-and-pinion gear is monolithic.

LIST OF DRAWINGS

IMPLEMENTATION OF THE INVENTION

Figure 1:
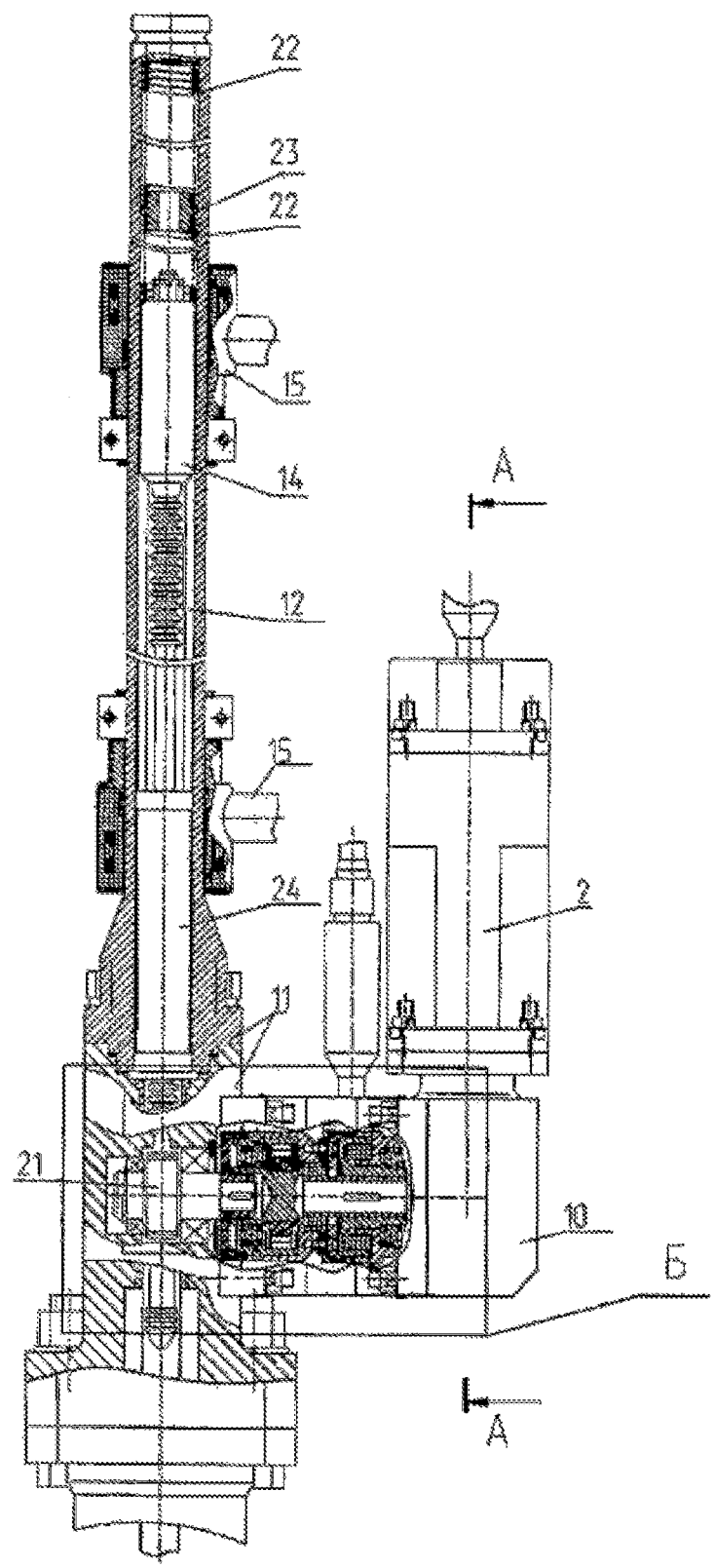
FIG. 1 shows a nuclear reactor emergency safety rod drive, general sectional view.
Figure 2:
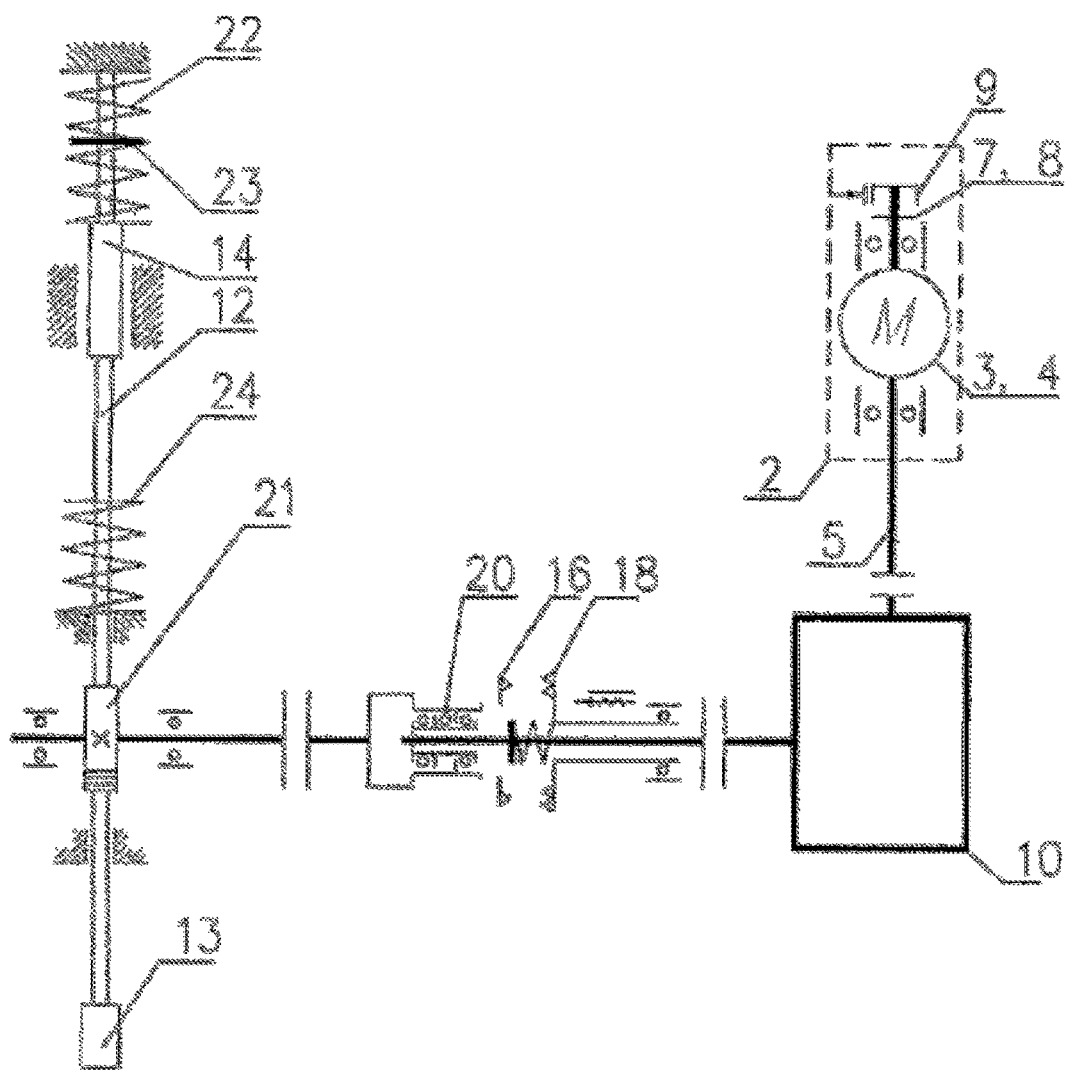
FIG. 2 shows a gearing diagram of the emergency safety rod drive from FIG. 1.
Figure 3:
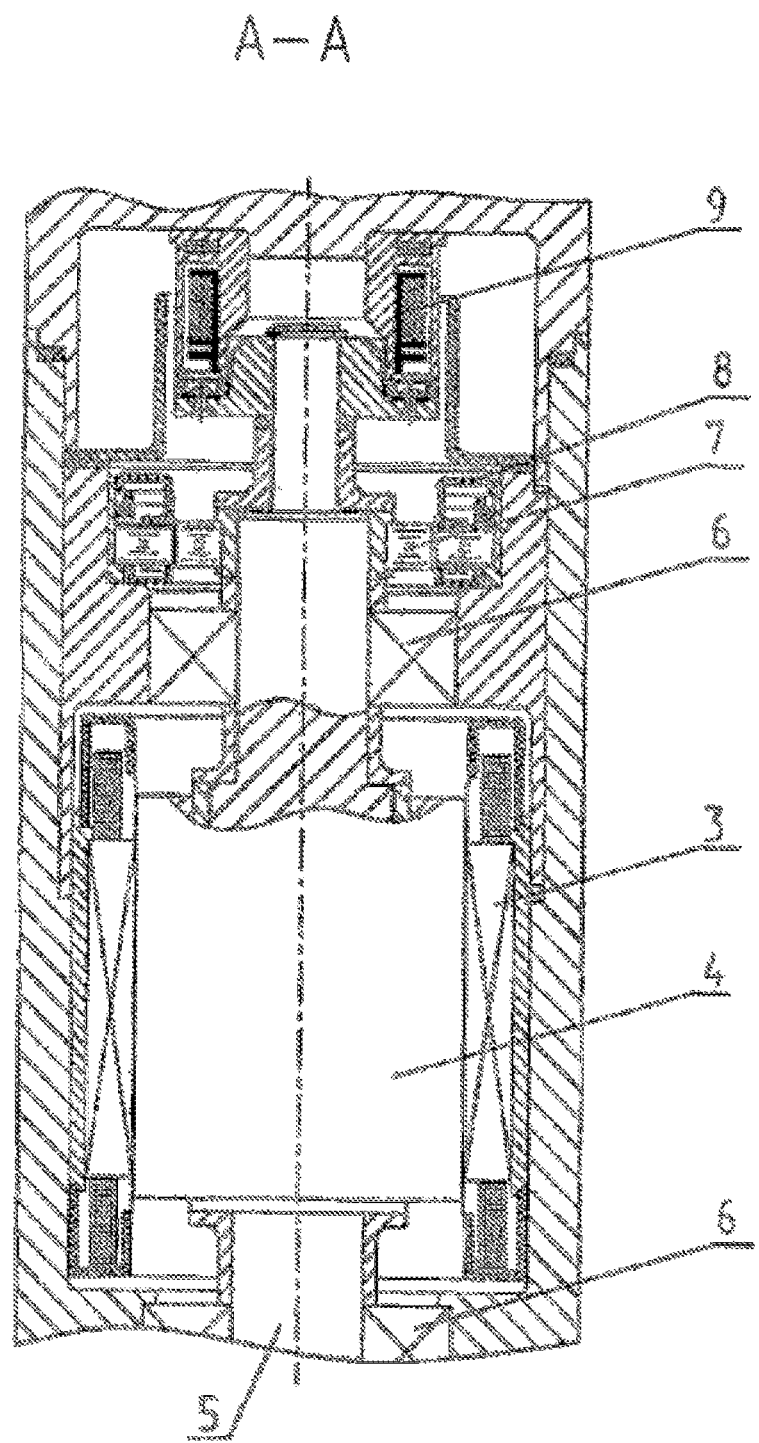
FIG. 3 shows section A-A from FIG. 1.
Figure 4:
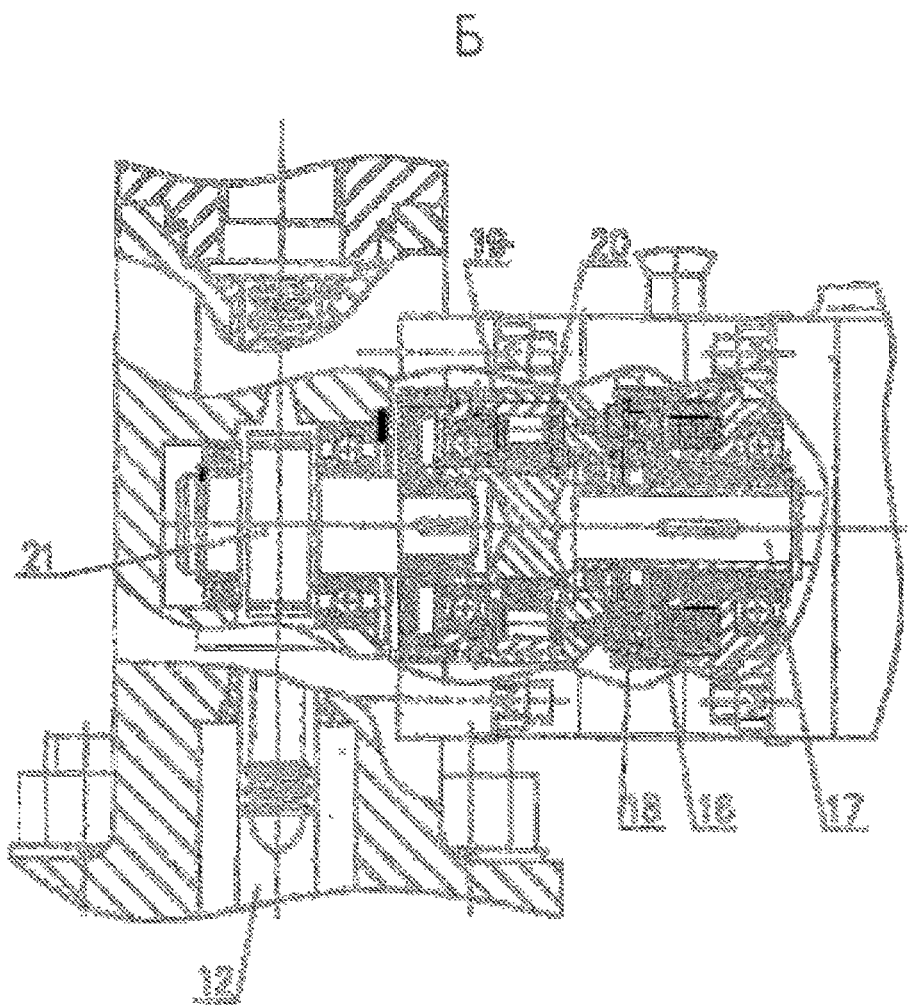
FIG. 4 shows detail B from FIG. 1.

The CPS emergency safety rod drive is rack-mounted on the nuclear reactor housing. The drive includes an electric drive (1) with a motor stator (3) fixed in its housing (2), and a motor rotor (4) installed on the motor shaft (5) by means of two rotating bearings (6). A resolver rotor (7) is installed on the motor shaft; its stator (8) is fixed in the housing (2). The contactless resolver serves a motor rotor angular position sensor. An electromagnetic brake (9) and reduction gear (10) are also installed on the electric drive shaft.

The rack-and-pinion gear includes a housing (11) and a toothed rack (12) installed along the housing axis. An absorber rod (13) is mounted at the end of the toothed rack (12). A magnet (14) is installed at the top of the toothed rack (12), which also serves as a toothed rack (12) guide. The magnet (14) is designed to send signals to the inductive limit switches (15) installed outside the housing case (11). The toothed rack (12) axis is parallel to the axis of the electric drive.

An electromagnetic clutch (16) is installed on the shaft (17) of the rack-and-pinion gear, its housing is secured against rotation. In addition, a gear half-coupling (18), that is also an overrun clutch (19) sleeve, is mounted on the input element of the electromagnetic clutch. An overrun clutch hub (20) is fixed on the shaft.

The torque is transmitted through the reduction gear (10) and clutch half-couplings (16) to the rack pinion (21).

A rack-separation spring (22) is installed at the top of the toothed rack (12) with a CPS absorber rod (13). The upper end of the spring (22) rests against the cover of the rack-and-pinion gear, and the lower end rests against the magnet sleeve (14). The rack-separation spring (22) consists of several springs divided by special bushings (23). A shock absorber (24) is installed in the rack-and-pinion gear housing (11).

The device operates in the following manner.

When an emergency protection warning signal is generated, the CPS absorber rod (13) is inserted into the core, and the electric drive is switched to lowering operation. When the shaft rotates for lowering operation, torque is transmitted through the reduction gear (10) and half-couplings of the electromagnetic clutch (16) to the rack pinion (21) converting the rotary motion into linear. When the absorber rod (13) reaches the lower limit switch (15), the electric drive is shut down. The brake clutch is deenergized and the motor drive is slowed down preventing upward motion of the toothed rack (12) with the CPS absorber rod (13).

According to an emergency protection alarm signal, the electromagnetic clutch (16) is deenergized, the moving part of the electromagnetic clutch is opened by the membrane spring built in the electromagnetic clutch housing, the drive train between the rack-and-pinion gear shaft (17) and electric drive shaft (5) is opened. As a result of the interlocked opening, the toothed rack (12) with the CPS absorber rod (13) is dropped into the reactor core by gravity and the separation spring (22). The spring is released along the full length of the absorber rod insertion, minimizing its insertion time, and the overrun clutch (19) prevents impact jumping of the absorber rod (13).

The drive gearing allows to drop the absorber rod from any intermediate position.

When the CPS absorber rod (13) is loaded (in case of scram during blackout) according to a signal for lifting operation from the lower position sent to the upper inductive limit switch (15), the process is as follows. Voltage is applied to the inductive limit switches (15), and the electromagnetic clutch (16). The drive train transmitting motion to the rack pinion (21) from the motor through the reduction gear (10) is closed. The electric drive is switched to lifting operation. The overrun clutch is inactive as rotation of its hub (20) and sleeve (19) is synchronized. The toothed rack (12) with the CPS absorber rod (13) moves up to the upper limit switch. Then the electric drive is switched off. In addition, the brake clutch (9) is also deenergized, the electric drive shaft (5) is slowed down, slipping of the CPS absorber rod (13) is excluded.

When lifting the CPS absorber rod (13) inserted without interruption of power supply, the electromagnetic clutch (16) shall be actuated. The motion of the CPS absorber rod (13) is similar to the mode described above.

The claimed design of the CPS emergency safety rod drive makes it possible to improve design reliability, reduce the time of negative reactivity insertion in case of an emergency, thus, substantially improving safety and reliability of the reactor plant as a whole.

The invention claimed is:

1. A drive of an emergency safety rod of a nuclear reactor, comprising:
    an electric drive;
    a reduction gear;
    a rack-and-pinion gear;
    wherein the electric drive includes an electric motor installed in a housing of the electric drive with a motor rotor position sensor, wherein the reduction gear is operable to change a rate of rotation of the electric drive for a required speed and power performance of the electric drive;
    a toothed rack installed along a axis of the rack-and-pinion gear to provide for a reciprocating motion of a system absorber control and a protection rod connected thereto;
    a toothed electromagnetic clutch having a contactless current supply installed on an inner shaft of the rack-and-pinion gear enabling a simultaneous mechanical coupling of half-couplings; and
    a reverse-motion coupling that is interlocked with a rack pinion, a rack-separation spring and toothed rack position sensors;
    wherein a normally closed electromagnetic brake is installed on a shaft of the electric drive.

2. The drive according to claim 1, wherein the electric motor comprises a contactless electric motor including permanent magnets.

3. The drive according to claim 1, wherein the motor rotor position sensor is contactless.

4. The drive according to claim 3, wherein the motor rotor position sensor comprises a contactless synchro resolver.

5. The drive according to claim 1, wherein a magnet is installed in an upper part of the toothed rack.

6. The drive according to claim 1, wherein an axis of the electric drive is parallel to an axis of the toothed rack.

7. The drive according to claim 1, wherein an inner cavity of the electric drive is leak-tight.

8. The drive according to claim 1, wherein the electric drive is a brushless electric motor.

9. The drive according to claim 1, wherein a rack-separation spring is installed above the toothed rack.

10. The drive according to claim 9, wherein the rack-separation spring is composite.

11. The drive according to claim 1, wherein inductive or contactless sensors are used as toothed rack position sensors.

* * * * *